United States Patent Office 3,372,377
Patented Mar. 5, 1968

3,372,377
DATA PROCESSING SYSTEM
Marius Cohn and Richard Lindaman, Minneapolis, Minn., assignors to Sperry Rand Corporation, New York, N.Y., a corporation of Delaware
Continuation-in-part of application Ser. No. 442,448, Mar. 24, 1965. This application Aug. 2, 1965, Ser. No. 476,458
15 Claims. (Cl. 340—146.2)

This is a continuation-in-part of our copending patent application Ser. No. 442,448 Mar. 24, 1965 which is a continuation-in-part of application Ser. No. 131,281 filed Aug. 14, 1961, now abandoned.

The present invention is concerned generally with a data processing system, and more particularly with such a processing system wherein the logical operations are performed by majority-decision elements.

In data processing systems, it is frequently necessary to conduct determinations of carries, comparisons, and the like, each of these operations among others capable of being performed by a number of techniques. In order to improve the reliability, speed of operation and the like, it is generally preferable that any of these processing operations be conducted with a minimum number of components consistent with the other system requirements. Since each component in the system is subject to failure, the probability of error of the system may be reduced by reducing the number of components. In addition, the speed of operation is inversely proportional to the number of logical levels included in the system, each level contributing its own integral portion of the overall delay. In order to enhance the speed of operation, and in order to increase the overall reliability of the system, majority-decision logic has been implemented in connection with various data processing operations including the determination of carries, comparisons, and the like. System utilizing majority-decision elements in accordance with the present invention have been found to significantly increase the speed of operation and decrease the number of components required to perform a logical determination of the particular type of interest. Economical advantages accordingly are available in connection with the system of the present invention. Systems of the present invention are adaptable for use in connection with words having almost unlimited length. The advantages of operation increase with an increase in word length.

Therefore, it is an object of the present invention to provide an improved data processing system employing majority-decision elements for performing certain logical operations.

It is a further object of the present invention to provide an improved data processing system employing majority-decision elements for high speed carry nets and for high speed comparators.

It is yet another object of the present invention to provide a data processing system employing a minimal number of majority-decision elements to perform logical operations with a minimum number of logic levels.

Other and further objects and advantages of the present invention will become apparent to those skilled in the art upon a study of the following specification appended claims and accompanying drawings, wherein:

The carry from any stage of an ordinary parallel binary adder is given by the majority of 3 bits; the addend bit and the augend bit corresponding to the particular bit stage under consideration, plus the next lower-order carry. In other words, the carry for the $i$th stage of such an adder may be represented by the following equation:

$$C_i = A_i \# B_i C_{i-1} \qquad (1)$$

In this function, the characters "#" represents a majority-decision operation. In Equation 1, $C_i$ is represented by the majority of the arguments $A_i$, $B_i$, and $C_{i-1}$. The carry, $C_{i-1}$, may be eliminated from the Equation 1 by replacing it with the function $A_{i-1} \# B_{i-1} \# C_{i-2}$. The repetition of this process can eventually eliminate all carries so that the highest order carry is ultimately expressed entirely in terms of various addend and augend bits. If, for example, $i=3$ (1) becomes $$C_3 = A_3 \# B_3 \# \{A_2 \# B_2 \# [A_1 \# B_1 \#(A_0 \# O \# B_0)]\} \qquad (2)$$

Equation 2, it will be observed includes four nested majority expressions, this expression corresponding to a diagram including four columns of elements and therefore requiring 4 periods of operation. Thus, utilizing Equation 2 in $n$-logic levels, (delay times) the carries can be determined for $n$-bit words.

Majority-decision logic facilitates the design of networks, such as comparators, carry-determning networks and the like, which require fewer components and fewer logic levels, thus providing a corresponding increase in reliability and reduction in operating time. It has been determined that in $m$-logic levels (delay times) the maximum number of carries that can be generated is $2^m-1$ and in general the number of logic levels, $m$, necessary to generate carries corresponding to words of order $n$ is uniquely determined by the inequality $2^{m-1} \leqslant n < 2^m$. For 7 bit words $A$ and $B$, for example, the method of Equation 2 would require 7 operating periods or delay times whereas the technique of the present invention permits these operations to be conducted in only three operating periods. This advantage increases rapidly with an increase in word length.

Figure 4:
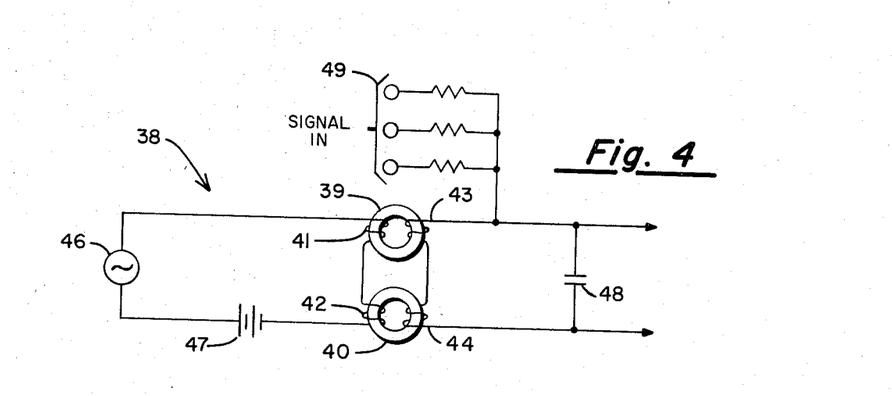
FIG. 4 is a circuit diagram of a modified majority-decision element which may be utilized in connection with the system of the present invention; and, FIG. 5 is a logic diagram of a comparator which is adapted to perform several majority-decision logic operations depending upon the nature of the various inputs thereto.

A simple majority-decision operation may be exemplified by the 3-input bistable parametron as illustrated in FIG. 4. This device has three coincident binary inputs and produces a binary output that agrees with the majority of the inputs. If at least two of the three inputs are binary "0"s the output of the majority-decision element is "0"; and if at least two of the three inputs are binary "1"s the output will be "1." In addition, one of the inputs may be permanently established as a binary "1," and in this case the majority-decision element will function as an OR element relative to the "1." If the constant input is changed to a "0" the element is modified to a 2-input AND relative to the binary "1." In place of the parametron, a tunnel diode or other type of threshold device may be successfully employed as the majority-decision element, such as for for example, appropriately arranged transistor elements or the like (with suitable input network) such as is shown in FIG. 4. It is important however, that the unit function as a threshold device in order that the majority logic system may be properly designed.

Figure 1A:
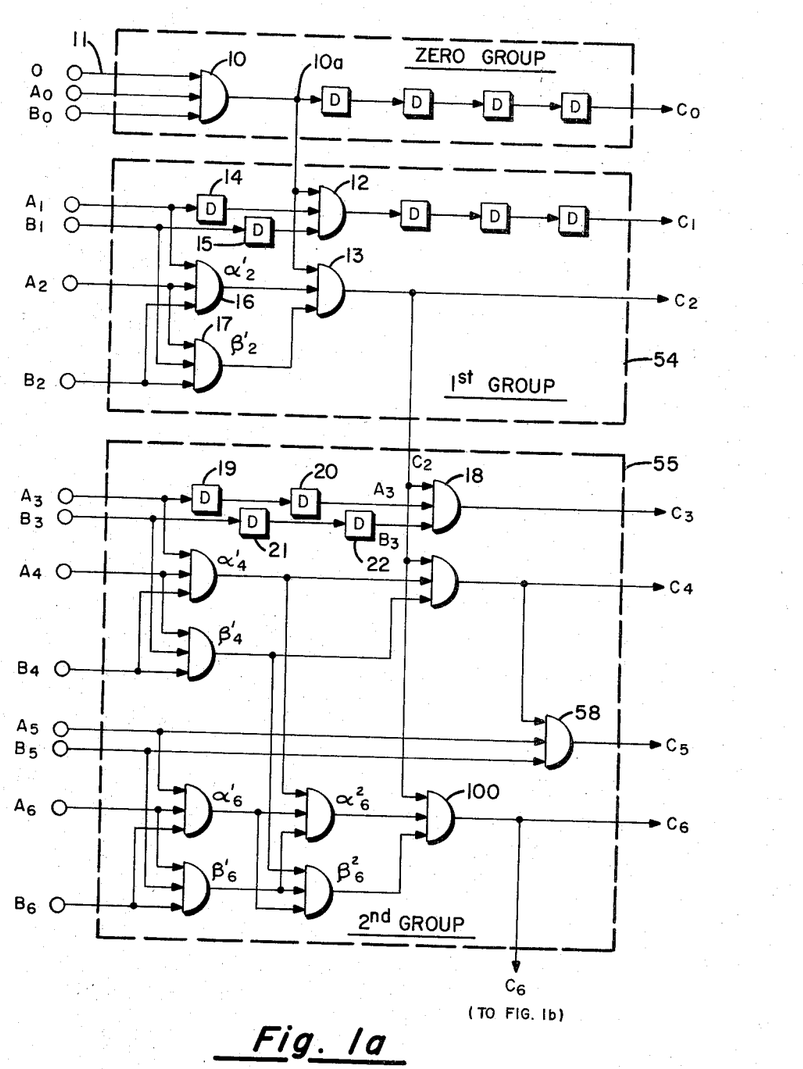
FIGS. 1(a), 1(b), and 1(c) form a partial logic diagram of an $n$ bit carry net derived by majority-decision logic.

In addition to greater speed, considerably fewer components are required when majority-decision elements are employed. Time delays are used to synchronize or otherwise arrange the timing of the operation from the input portion to the output portion. To simplify the drawings, only a few delay elements are shown in FIG. 1a. Delay elements are inexpensive in comparison to majority-decision elements. The extent of the delay required will, of course, depend upon the individual components used in the system. Thus, in certain applications, specific delay elements having lengthy delay characteristics will be required, while in certain other applications, an extended length of conductor may be adequate to provide the delay necessary for coincidence.

Figure 1B:
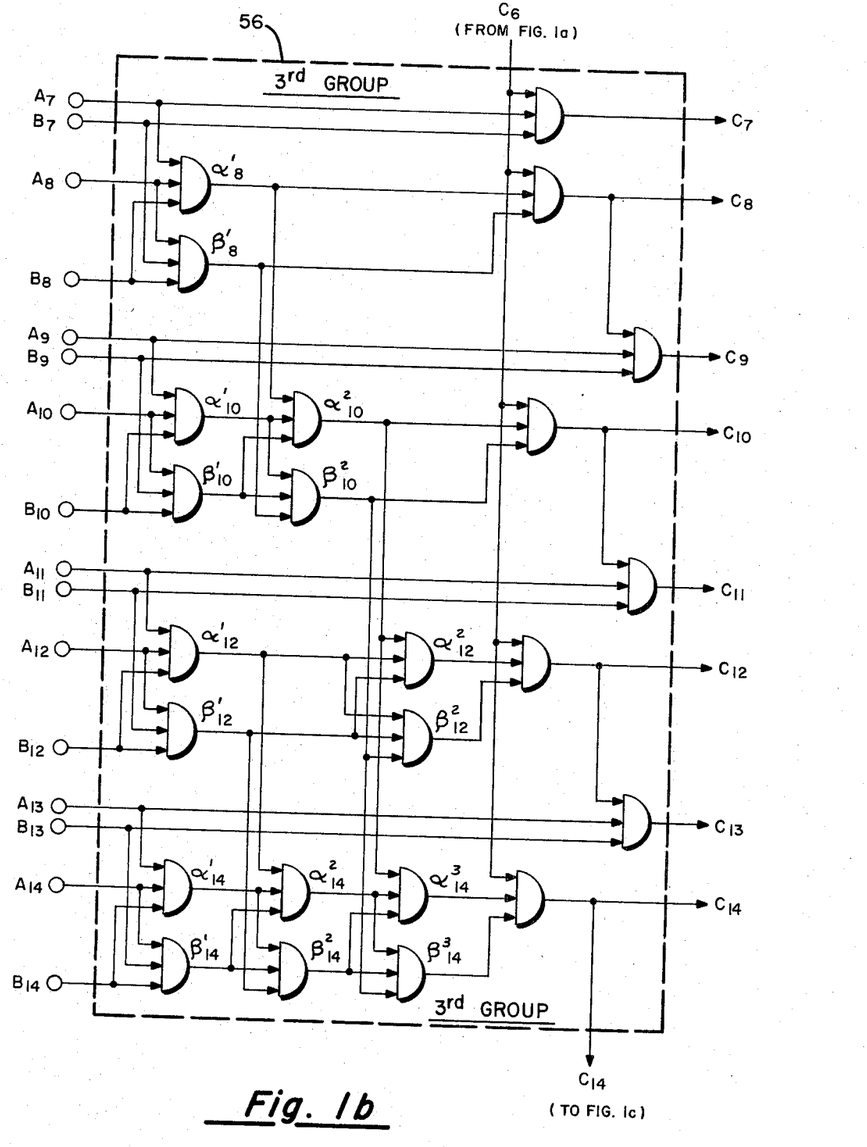
Figure 1C:
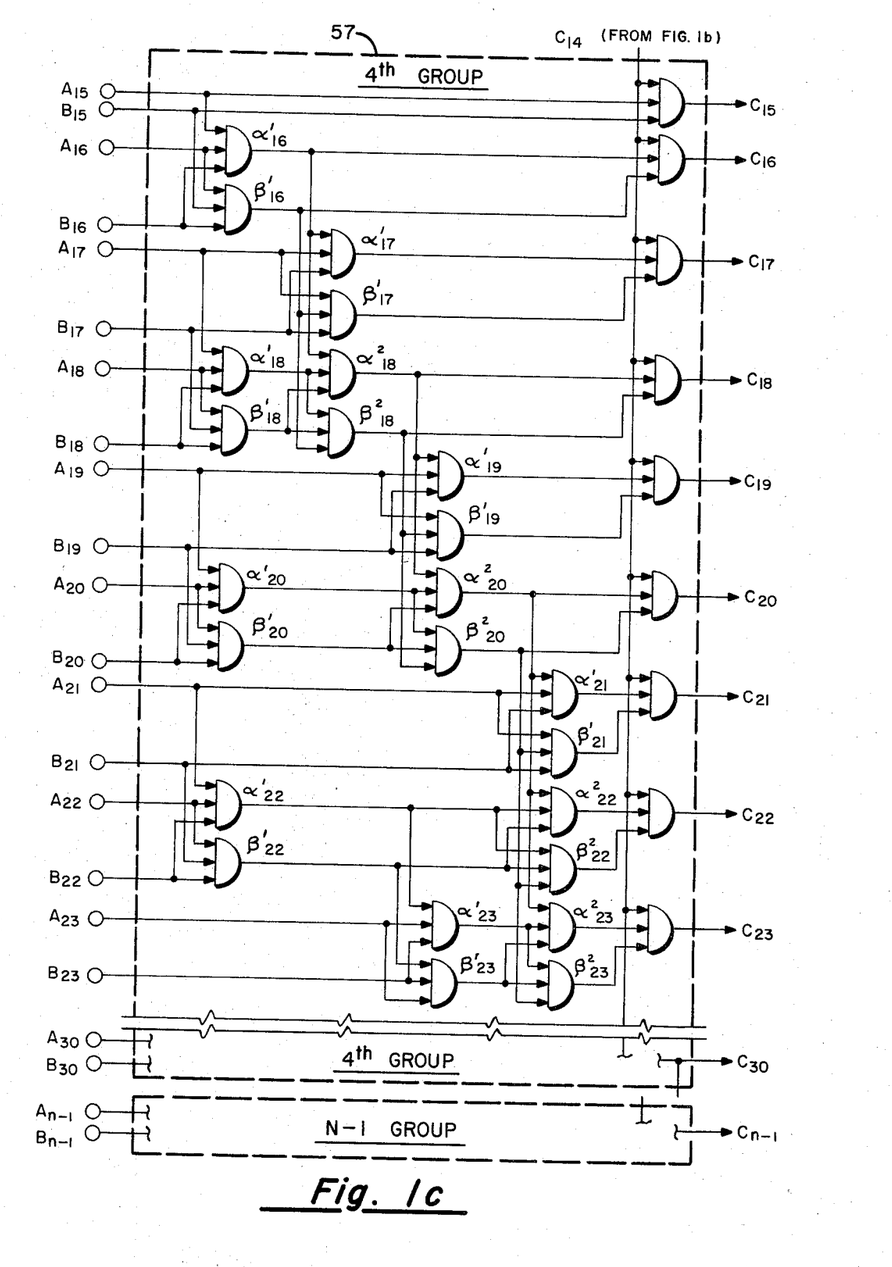

Reference is made to FIGS. 1a, 1b and 1c of the drawings wherein an $n$ bit carry net for determining carries corresponding to an augend and an addend, of order $n$, is partially shown. The carries for the first 4 bit orders are determined in 3 periods utilizing a minimum of majority-decision elements; a total of only 6 elements being utilized. It will be appreciated that the first majority-decision element 18 is provided with an unconditional binary "0," on input line 11, thereby forming a conventional AND circuit. The output from the first majority-decision element is fed simultaneously to the input of second and third majority-decision elements, 12 and 13, in a first group of majority logic circuits 54, the other 2 inputs to the second element being provided by the second bit stage of the individual words. In order to synchronize the input operation between the first and second majority-decision element, a pair of delay elements 14 and 15 are interposed between the input junction for the bits $A_1$ and $B_1$ and the input to the majority-decision element per se. The extent of delay provided in this pair of delays will, of course, be determined by the nature of the first majority-decision element 10, considering operation speed, nature of operation, or like characteristics of this element. The input to the second bit stage of the system, in addition to being directed to the element receiving the carry from the first bit stage is directed to fourth and fifth majority-decision elements 16 and 17 respectively, one bit of each word from the second bit stage being directed to separate elements. These fourth and fifth elements are further provided with inputs from the third bit stage, these inputs establishing the odd number of 3 inputs provided respectively to these elements. The respective outputs of the fourth and fifth majority-decision elements are directed to the input of the third majority-decision element 13, the third input being provided by the carry from the first bit stage as indicated previously. The output from the third majority-decision element 13 is carried directly as a second period operation to the input of the majority-decision element 18 in a second group of majority logic circuits 55 which is adapted to accommodate the fourth bit stage of the individual words. In order to properly synchronize the operation, the input to the fourth bit stage, $A_3$, $B_3$ is provided with appropriate signal delays 19, 20, 21 and 22 in order that these signals will be third period signals and arrive simultaneously at the sixth majority-decision element. Assuming a delay element may be fabricated with a time period substantially equal to the delay incurred in other portions of the circuitry, a pair of these delays for each input functioning substantially in serial relationship will be required. The remaining inputs in FIGS. 1(a), 1(b) and 1(c) are appropriately provided with delays (not shown) in order that each majority-decision element may be simultaneously actuated or rendered operative. Thus, the carries for 4 stages of bits are determined utilizing 3 periods of delay and utilizing a minimum of components.

Figure 6:
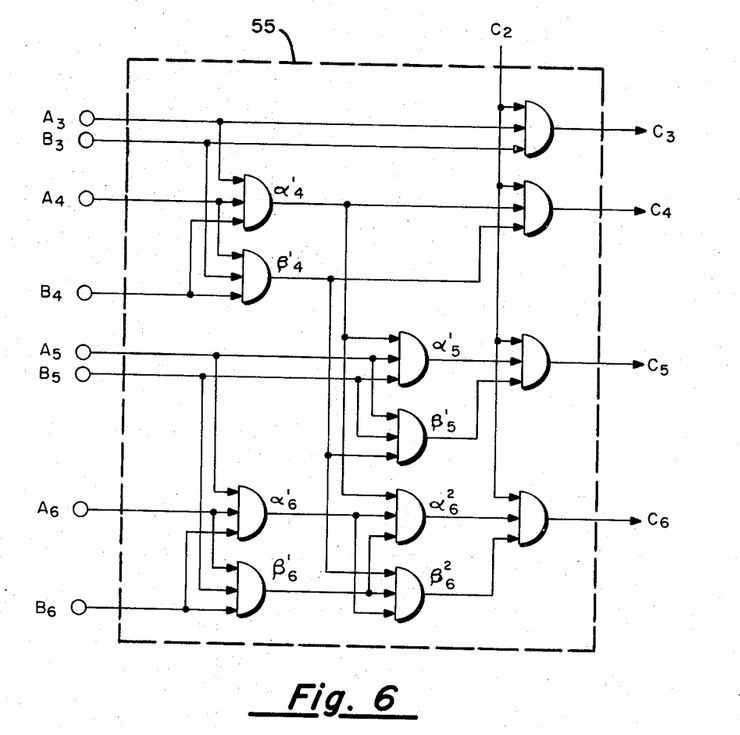
FIG. 6 is a logic diagram of a further embodiment of a part of the network shown in FIG. 1(a).

Similarly, the carries for the 7 bit orders shown in groups of majority logic circuits 54 and 55 can be determined in 3 periods of delay although as shown in FIG. 1(a), 4 delay periods are used to obtain carry pulse $C_5$. FIG. 6 shows how carry pulse $C_5$ may be obtained in 3 delay periods when the majority decision elements are coupled according to the equation for $C_5$ shown in Table I. FIGS. 1(a), 1(b), and 1(c) show a carry determining network for $n$ bits. The function $$C_{max.} = 2^m - 1 \qquad (3)$$

shows that for 4 logic levels or delays, the maximum number of carries that can be generated is 15. Therefore, since at least 5 logic levels must be used if more than 15 carries are to be determined, then the configuration shown in FIG. 1(a) can be used to save elements even though it adds a delay level to that particular group only (not to higher order succeeding groups which also have 5 or more delay levels). Similarly, carry bits $C_7$, $C_9$, $C_{11}$, $C_{13}$, etc., could each be obtained in one less logic or delay level but since, as shown in FIGS. 1(a), 1(b), and 1(c), each of these circuits uses less elements with no increase in total system delay time, the particular configuration shown is most desirable.

This design calculus for the arrangement of FIGS. 1(a), 1(b), and 1(c) is formulated in detail in our article entitled "Axiomatic Majority-Decision Logic," IRE Transactions on Electronic Computers; vol. EC–10, No. 1, March 1961.

A set of working theorems for manipulating majority logic expressions may be derived, these theorems providing a basis for the following identity:

$$C_i = A_i \# B_i \# C_{i-1} = W \# X \# (Y \# Z \# Q) \qquad (4)$$
$$= (W \# X \# Y) \# (W \# X \# Z) \# Q \qquad (5)$$
$$= \alpha \# \beta \# Q \qquad (6)$$

where $A_i = W$, $B_i = X$, $C_i = (Y \# Z \# Q)$, $Y = A_{i-1}$, $Z = B_{i-1}$ and $Q = C_{i-2}$.

A complete carry net for $n = 24$ is set forth below and shown diagrammatically in FIGS. 1(a), 1(b), and 1(c). This device is represented by the Equations 4, 5 and 6.

*Table I*

$C_0 = A_0 \# B_0 \# 0$
$C_1 = A_1 \# B_1 \# C_0$
$C_2 = A_2 \# B_2 \# C_1 = (A_2 \# B_2 \# A_1) \# (A_2 \# B_2 \# B_1) \# C_0$
$\qquad = \alpha'_2 \# \beta'_2 \# C_0$
$C_3 = A_3 \# B_3 \# C_2$
$C_4 = A_4 \# B_4 \# C_3 = (A_4 \# B_4 \# A_3) \# (A_4 \# B_4 \# B_3) \# C_2$
$\qquad = \alpha'_4 \# \beta'_4 \# C_2$
$C_5 = A_5 \# B_5 \# C_4 = (A_5 \# B_5 \# \alpha'_4) \# (A_5 \# B_5 \# \beta'_4) \# C_2$
$\qquad = \alpha'_5 \# \beta'_5 \# C_2$
$C_6 = A_6 \# B_6 \# C_5 = [(A_6 \# B_6 \# A_5) \# (A_6 \# B_6 \# B_5) \# \alpha'_4]$
$\qquad \# [(A_6 \# B_6 \# A_5) \# (A_6 \# B_6 \# B_5) \# \beta'_4]$
$\qquad \# C_2$
$\qquad = (\alpha^1_6 \# \beta^1_6 \# \alpha'_4) \# (\alpha^1_6 \# \beta^1_6 \# \beta'_4) \# C_2$
$\qquad = \alpha^2_6 \# \beta^2_6 \# C_2$
$C_7 = A_7 \# B_7 \# C_6$
$C_8 = A_8 \# B_8 \# C_7 = (A_8 \# B_8 \# A_7) \# (A_8 \# B_8 \# B_7) \# C_6$
$\qquad = \alpha'_8 \# \beta'_8 \# C_6$
$C_9 = A_9 \# B_9 \# C_8$
$C_{10} = A_{10} \# B_{10} \# C_9 = A_{10} \# B_{10} \# (A_9 = B_9 \# C_8)$
$\qquad = A_{10} \# B_{10} \# [A_9 \# B_9 \# (\alpha'_8 \# \beta'_8 \# C_6)]$
$\qquad = A_{10} \# B_{10} \# [(A_9 \# B_9 \# \alpha'_8) \# (A_9 \# B_9 \# \beta'_8 \# C_6]$
$\qquad = A_{10} \# B_{10} \# (A_9 \# B_9 \# \alpha'_8)$
$\qquad \# A_{10} \# B_{10} \# (A_9 \# B_9 \# \beta'_8)$
$\qquad \# C_6$
$\qquad = [(A_{10} \# B_{10} \# A_9) \# (A_{10} \# B_{10} \# B_9) \# \alpha'_8]$
$\qquad \# [(A_{10} \# B_{10} \# A_9) \# (A_{10} \# B_{10} \# B_9) \# \beta'_8] \# C_6$
$\qquad = (\alpha^1_{10} \# \beta^1_{10} \# \alpha'_8) \# (\alpha^1_{10} \# \beta^1_{10} \beta'_8) \# C_6$
$\qquad = \alpha^2_{10} \# \beta^2_{10} \# C_6$
$C_{11} = A_{11} \# B_{11} \# C_{10}$
$C_{12} = A_{12} \# B_{12} \# C_{11} = (A_{12} \# B_{12} \# A_{11}) \# (A_{12} \# B_{12} \# B_{11})$
$\qquad \# \alpha^2_{10} \# (A_{12} \# B_{12} \# A_{11}) \# (A_{12} \# B_{12} \# B_{11}) \# \beta^2_{10} \# C_6$
$\qquad = (\alpha^1_{12} \# \beta^1_{12} \# \alpha^2_{10}) \# (\alpha^1_{12} \# \beta^1_{12} \# \beta^2_{10}) \# C_6$
$\qquad = \alpha^2_{12} \# \beta^2_{12} \# C_6$ $C_{13} = A_{13} \# B_{13} \# C_{12}$ $C_{14} = A_{14} \# B_{14} \# C_{13} = \{[(A_{14} \# B_{14} \# A_{13}) \# (A_{14} \# B_{14} \# B_{13}) \# \alpha^1{}_{12}] \# [(A_{14} \# B_{14} \# A_{13}) \# (A_{14} \# B_{14} \# B_{13}) \# \beta^1{}_{12}] \# \alpha^2{}_{10}\}$
$\# \{[(A_{14} \# B_{14} \# A_{13}) \# (A_{14} \# B_{14} \# B_{13}) \# \alpha^1{}_{12}] \# [(A_{14} \# B_{14} \# A_{13}) \# A_{14} \# B_{14} \# B_{13}) \# \beta^1{}_{12}] \# \beta^2{}_{10}\}$
$\# C_6$
$= [(\alpha^1{}_{14} \# \beta^1{}_{14} \# \alpha^1{}_{12}) \# (\alpha^1{}_{14} \# \beta^1{}_{14} \# \beta^1{}_{12}) \# \alpha^2{}_{10}] \# [(\alpha^1{}_{14} \# \beta^1{}_{14} \# \alpha^1{}_{12}) \# (\alpha^1{}_{14} \# \beta^1{}_{14} \# \beta^1{}_{12}) \# \beta^2{}_{10}] \# C_6$
$= (\alpha^2{}_{14} \# \beta^2{}_{14} \# \alpha^2{}_{10}) \# (\alpha^2{}_{14} \# \beta^2{}_{14} \# \beta^2{}_{10}) \# C_6$
$= \alpha^3{}_{14} \# \beta^3{}_{14} \# C_6$ $C_{15} = A_{15} \# B_{15} \# C_{14}$ $C_{16} = A_{16} \# B_{16} \# C_{15} = (A_{16} \# B_{16} \# A_{15}) \# (A_{16} \# B_{16} \# B_{15}) \# C_{14}$
$= \alpha'_{16} \# \beta'_{16} \# C_{14}$ $C_{17} = A_{17} \# B_{17} \# C_{16} = (A_{17} \# B_{17} \# \alpha'_{16}) \# (A_{17} \# B_{17} \# \beta'_{16}) \# C_{14}$
$= \alpha'_{17} \# \beta'_{17} \# C_{14}$ $C_{18} = A_{18} \# B_{18} \# C_{17} = [(A_{18} \# B_{18} \# A_{17}) \# (A_{18} \# B_{18} \# B_{17}) \# \alpha^1{}_{16}] \# [(A_{18} \# B_{18} \# A_{17}) \# (A_{18} \# B_{18} \# B_{17}) \# \beta^1{}_{16}] \# C_{14}$
$= (\alpha^1{}_{18} \# \beta^1{}_{18} \# \alpha^1{}_{16}) \# (\alpha^1{}_{18} \# \beta^1{}_{18} \# \beta^1{}_{16}) \# C_{14}$
$= \alpha^2{}_{18} \# \beta^2{}_{19} \# C_{14}$ $C_{19} = A_{19} \# B_{19} \# C_{18} = (A_{19} \# B_{19} \# \alpha^2{}_{18}) \# (A_{19} \# B_{19} \# \beta^2{}_{18}) \# C_{14}$
$= \alpha'_{19} \# \beta'_{19} \# C_{14}$ $C_{20} = A_{20} \# B_{20} \# C_{19} = [(A_{20} \# B_{20} \# A_{19}) \# (A_{20} \# B_{20} \# B_{19}) \# \alpha^2{}_{18}] \# [(A_{20} \# B_{20} \# A_{19}) \# (A_{20} \# B_{20} \# B_{19}) \# \beta^2{}_{18}] \# C_{14}$
$= (\alpha^1{}_{20} \# \beta^1{}_{20} \# \alpha^2{}_{18}) \# (\alpha^1{}_{20} \# \beta^1{}_{20} \# \beta^2{}_{18}) \# C_{14}$
$= \alpha^2{}_{20} \# \beta^2{}_{20} \# C_{14}$ $C_{21} = A_{21} \# B_{21} \# C_{20} = (A_{21} \# B_{21} \# \alpha^2{}_{20}) \# (A_{21} \# B_{21} \# \beta^2{}_{20}) \# C_{14}$
$= \alpha^1{}_{21} \# \beta^1{}_{21} \# C_{14}$ $C_{22} = A_{22} \# B_{22} \# C_{21} = [(A_{22} \# B_{22} \# A_{21}) \# (A_{22} \# B_{22} \# B_{21}) \# \alpha^1{}_{20}] \# [(A_{22} \# B_{22} \# A_{21}) \# (A_{22} \# B_{22} \# B_{21}) \# \beta^2{}_{20}] \# C_{14}$
$= [\alpha^1{}_{22} \# \beta^1{}_{22} \# \alpha^2{}_{20}] \# [(\alpha'_{22}) \# (\beta'_{22}) \# \beta^2{}_{20}] \# C_{14}$
$= \alpha^2{}_{22} \# \beta^2{}_{22} \# C_{14}$ $C_{23} = A_{23} \# B_{23} \# C_{22} = [(A_{23} \# B_{23} \# \alpha^1{}_{22}) \# (A_{23} \# B_{23} \# \beta^1{}_{22}) \# \alpha^2{}_{20}] \# (A_{23} \# B_{23} \# \alpha^1{}_{22}) \# (A_{23} \# B_{23} \# \beta^1{}_{22}) \# \beta^2{}_{20}] \# C_{14}$
$= [\alpha^1{}_{23} \# \beta^1{}_{23} \# \alpha^2{}_{20}] \# [\alpha'_{23}) \# (\beta'_{23}) \# \beta^2{}_{20}] \# C_{14}$
$= \alpha^2{}_{23} \# \beta^2{}_{23} \# C_{14}$ In deriving this network, only one majority logic manipulation is used, this being the application of Equation 4 to Equation 5 to produce:

$$C_2 = (A_2 \# B_2 \# A_1) \# (A_2 \# B_2 \# B_1) \# C_0 \quad (7)$$

Using Equations 4 and 5 and substituting $i=2$, the following identity is formed:

$(A_2 \# B_2 \# A_1) \# (A_2 \# B_2 \# B_1) \# C_0$
$= A_2 \# B_2 \# (A_1 \# B_1 \# C_0) = A_2 \# B_2 \# C_1 \quad (8)$ This manipulation must be performed repeatedly for arbitrarily long words. The carry net of FIGS. 1(a), 1(b), and 1(c) requires 3 periods to determine the carries for 4 bit words. As indicated previously, the 4 bit word length merely provides a convenient illustration and 3 periods of operation may determine carries for words up to 7 bits in length while 4 periods include 15 bit words and 5 periods include 31 bit words. It will be appreciated that a substantial reduction in majority-decision elements has been accomplished utilizing the design of FIGS. 1(a), 1(b) and 1(c). This reduction may, in certain cases, require the addition of a number of delay elements. As indicated previously, these delay elements are generally modest in cost. This is particularly true in high speed circuitry applications.

Thus, it will be seen that the network shown in FIGS. 1(a), 1(b), and 1(c) generates signals representative of carries $C_{n-1} \ldots C_1 \ldots C_0 C_0$ corresponding to an augend of the form $A_{n-1} \ldots A_1 \ldots A_1 A_0$ and an addent of the form $B_{n-1} \ldots B_1 \ldots B_1 B_0$ and comprises a group of terminals for receiving the signals representing the respective order operand digits $(A_{n-1}, B_{n-1}) \ldots (A_1, B_1) \ldots (A_1, B_1) (A_0, B_0)$ including a zeroth group for generating $C_0$. A first group of majority logic circuits 54 coupled to said receiving terminals and responsive to a first group of 2 lower order operands $(A_1, B_1)$, $(A_2, B_2)$ in said lower order group and of $C_0$ generated by a zeroth group, a second group of majority logic circuits 55 coupled to said receiving terminals and responsive to a second group of 4 higher order operands $(A_3, B_3 \ldots (A_6, B_6)$ from said receiving terminals and the output $C_2$ of the highest order carry digit determining circuit (13, 16 and 17) in the respective preceding group 54 for determining 4 carries for said second group of higher order operand pulses as a function of only the operand digits $(A_3, B_3) \ldots (A_6, B_6)$ in said second group of operands and the highest order carry digit $(C_2)$ determined in said first group of carry determining circuits 54, and an $N_i$th group of majority logic circuits coupled to said receiving terminals and responsive to an $N_i$th group of $2^{N_i}$ higher order operands from said terminals and the output of the highest order carry digit determining circuit in the respective preceding group for determining $2^{N_i}$ carries for said $N_i$th group of higher order operands as a function of only the operand digits in said $N_i$th group of operands and the highest order cary digit determined in said respective preceding group $N_{i-1}$ of carry determining circuits wherein $N_i = 0, 2 \ldots N-1$. Further, it can be seen that for the $i$th group, $N_i = m_i - 1$ the maximum number of carries that can be generated, is given by $$C_{i\ max.} = 2^{m_i - 1}$$

where $m_i$ is the number of delay levels in the $i$th group. For instance, in group one which has 2 delay levels and, thus, $m_i = 2$, the number of carries is 2. Similarly in group two which has 3 delay levels (as optimized and shown is FIG. 6) and $m_i = 3$, the number of carries is 4. Also, group 3 which has 4 delay levels (provided the circuits for producing $C_9$, $C_{11}$, and $C_{13}$, are modified as shown above for $C_5$) and $m_i = 4$, the number of carries is 8. Further, it is readily apparent that for a given word length, $n$, a full carry generator must generate $n$ carries. The number of logic levels $m$ necessary to generate $n$ carries is given by $\log_2 (n+1)$ when $(n+1)$ is an integral power of 2 and $\log_2 (n+1)$ rounded to the next higher integer when $(n+1)$ is not an integral power of two. The total number of groups, $N$, necessary to generate $n$ carries is just equal to $m$. Hence, for word length $n$ the number of groups necessary is given by $$2^{N-1} \leq n < 2^N$$

The number of carries generated by any group $N_i = 0 \ldots N-2$ is $2^{N_i}$ and they are $$C_{2(2^{N_i}-1)} \ldots C_{2^{N_i}-1}$$

The number of carries generated by the last group $N_i = N-2$ is $$n - \sum_{N_i=0}^{N-2} 2^{N_i}$$

and they are $C_{n-1} \ldots C_{2^{N-1}}$. All carries of a given group, $N_i$, are generated utilizing only signal representations of the digit orders of $A$ and $B$ corresponding to the carries generated by that particular group and $$C_{2^{N-i}-2}$$

the latter being representative of the highest digit order carry generated by the next lower order carry generating group $N_{i-1}$.

In each of the groups $N_i=0, 1, 2, \ldots N-2$ the highest order carry generated by $N_i$ is a function only of the augend and addend orders received by $N_i$ and the highest order carry generated by the next preceding group $N_{i-1}$. The highest order carry generated by $N_i$ is given by:

$$C_{2(2^{N_i}-1)} = \alpha^{N_i}_{2(2^{N_i}-1)} \# \beta^{N_i}_{2(2^{N_i}-1)} \# C_{2^{N_i}-2} \qquad (10)$$

where $$\alpha_q^{P+1} \equiv \alpha_{q-2^P}^P \# \alpha_q^P \# \beta_q^P$$

$$\beta_q^{P+1} \equiv \beta_{q-2^P}^P \# \beta_q^P \# \alpha_q^P$$

$$\alpha_q^0 \equiv A_q, \beta_q^0 \equiv B_q, \text{ and } C_{-1} \equiv 0$$

The number of logic levels needed to generated $$C_{2(2^{N_i}-1)}$$

is $N_i+1$. Given this minimum number of logic levels the precise manner in which $$C_{2^{N_i+1}-3} \ldots C_{2^{N_i}-1}$$

are generated is not critical to this invention so long as they are generated in no more than N logic levels. It is preferable to generate these carries with a minimum of majority logic elements. In the last group, $N_i=-1$, the highest order carry generated is $C_{n-1}$. If $n-1=2^N-2$ the $$C_{n-1} \ldots C_{2^{N-i}-1}$$

last group is full and carries $C_{n-1} \ldots C_{2n-1-1}$ are generated as in any other group. If $n-1 < 2^N-2$ the last group is not full and $C_{n-1} \ldots C_{2n-1-1}$ are generated in no more that N logic levels utilizing a minimum number of majority logic elements.

Consider group three, in which case $N_i=3$. Then, $2(2^{N_i}-1)=14$ and the highest order carry generated by group three is $C_{14}$. According to Equation 10, $$C_{14} = \alpha_{14}^3 \# \beta_{14}^3 \# C_6 \qquad (11)$$

and $$\alpha_{14}^3 = \alpha_{10}^2 \# \alpha_{14}^2 \# \beta_{14}^2$$

$$\beta_{14}^3 = \beta_{10}^2 \# \beta_{14}^2 \# \alpha_{14}^2$$

These expressions may be verified by observing the group shown in FIG. 1b for generating $C_{14}$. It is easily seen that $\alpha_{14}^3$ and $\beta_{14}^3$ are functions only of $(A_7 \ldots A_{14})$ and $(B_7 \ldots B_{14})$ thereby indicating that $C_{14}$ is a function only of $C_6$, $(A_7 \ldots A_{14})$, and $(B_7 \ldots B_{14})$.

Figure 2:
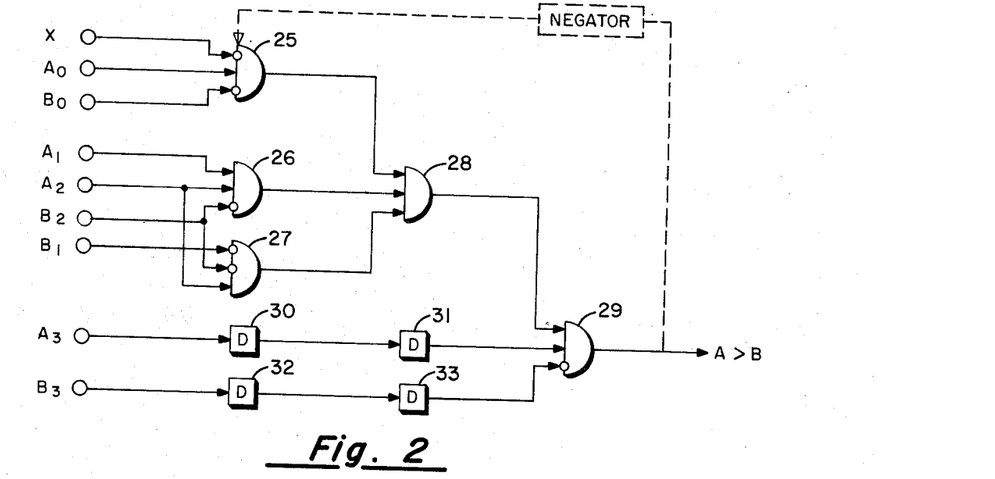
FIG. 2 is a logic diagram of a 4 bit high speed comparator derived by majority-decision logic.

Referring now to FIG. 2, a comparator circuit using majority-decision elements is illustrated, this circuit being based upon the identical logic structure as utilized in the carry net of FIGS. 1a, 1b and 1c. In order to appropriately operate as a comparator, one of the word inputs must be negated throughout the system, such as for example, the B input. Furthermore, since specific carries for comparisons are not utilized in this circuit, at least one of the majority-decision elements may be omitted. In addition, delay elements to provide coincident output will not be required; however, means to provide simultaneous inputs to various components of the system will be retained. The comparator as shown in FIG. 2 will, if X is a "0," give a "1" output for $A>B$ and a "0" output for $A \leq B$. If X is a "1," the comparator will give a "1" output for $A \geq B$ and a "0" output for $A<B$. If the output of the comparator is negated and applied as a feed back signal in place of the X signal, an interesting effect is produced. If the individual inputs A and B are continuously applied, the output becomes an alternating series, for example, 0101 for $A=B$. This arrangement does not affect the operation of the comparator for the situation where A does not equal B. The result is that all 3 of the possible conditions, $A>B$, $A<B$ and $A=B$ can be completely distinguished in 2 periods of operation. The majority-logic comparator as illustrated in FIG. 2 is adapted to compare two multibit numbers A and B, where A and B are unsigned numbers in normal binary code and the comparison is of magnitude only. If A and B are signed numbers and are to be compared algebraically, they cannot be in normal binary code and the comparator must be altered accordingly. If, for example, A and B are in either of the binary notations commonly used to represent signed numbers in digital computers (ones-complement or twos-complement), the comparator design may be altered by reversing the negation (or lack thereof) at two inputs; the most significant bit of A and the most significant bit of B. Since both normal and complemented inputs are assumed to be available, this change leaves the remaining structure of the comparator unchanged. A modification may be incorporated into the comparator shown in FIG. 2 for use as either a continuous sensing system, or for use in alternate operating cycles capable of determining whether $A>B$ or $A<B$. If the alternate cycle system is employed wherein $X=0$ in one cycle and $X=1$ in the next operating cycle, the individual result from one cycle may be stored until the next cycle in a conventional flip-flop system or the like. Thus, the condition of word values of A being greater than B and the condition of A being equal to B may be resolved separately in succeeding cycles, and by the process of elimination the possibility of B being greater than A may also be resolved.

Similarly, the device shown in FIGS. 1a, 1b, and 1c may be used as a comparator by complementing either all B inputs or all A inputs to the system. Then a comparison through the jth digit order, $K_j$, of A and B may be obtained at any desired output representing a carry in FIGS. 1a, 1b, and 1c. The number of groups N necessary to generate $K_j$ is given by $2^{N-1} \leq j < 2^N$. Each group $N_i=0 \ldots N-2$ receives as input signal representations of digit orders $$A_{2(2^{N_i}-1)} \ldots A_{2^{N_i}-1}, \overline{B}_{(2^{N_i}-1)} \ldots \overline{B}_{2^{N_i}-1}$$

and a comparison signal $K_{2^{N_i}-2}$, the latter being representative of a comparison through the $2^{N_i}-2$ digit order and generates signals representative of $K_j$ where $$2^{N_i}-1 \leq j < 2(2^{N_i}-1)$$

in $N_i+1$ logic levels. The highest order comparison generated by $N_i$ is given by:

$$K_j = \alpha^{N_i}_{2(2^{N_i}-1)} \# \beta^{N_i}_{2(2^{N_i}-1)} \# K_{2^{N_i}-2}$$

where $$\alpha_q^{P+1} \equiv \alpha_{q-2^P}^P \# \alpha_q^P \# \beta_q^P$$

$$\beta_q^{P+1} \equiv \beta_{q-2^P}^P \# \beta_q^P \# \alpha_q^P$$

$$\alpha_q^0 \equiv A_q, \text{ and } \beta_q^0 \equiv \overline{\beta}_q$$

The number of logic levels needed to generate $K_j$ is $N_i+1$. Given this minimum number of logic levels the precise manner in which $$K_{2^{N_i+1}-3} \ldots K_{2^{N_i}-1}$$

are generated is not critical to this invention so long as they are generated in less than $N_i+1$ logic levels. It is preferable to generate these comparisons with a minimum of majority logic elements. In the last group, $N_i=N-1$, the highest order comparison generated is $K_{n-1}$. If $n-1=2^N-2$ the last group is full and comparisons $K_{n-1} \ldots K_{2^{N-1}-1}$ are generated in any other group. If $n<2^N-2$ the last group is not full and $K_{n-1} \ldots K_{2^{N-1}-1}$ are generated in no more than N logic levels utilizing a minimum number of majority logic elements. If the comparison is not to be made at outputs $C_1$, $C_3$, $C_5$, $C_7$, etc., all majority logic elements used only to form these outputs may be omitted. Thus when $j \geq 2(2^{N_i}-1)$ only $$K_{2(2^{N_i}-1)}$$

need be generated by $N_i$. Hence, element 12 ($C_1$), element 18 ($C_3$), element 58 ($C_5$), etc. may be omitted, if no comparison is to be made at these outputs.

Figure 5:
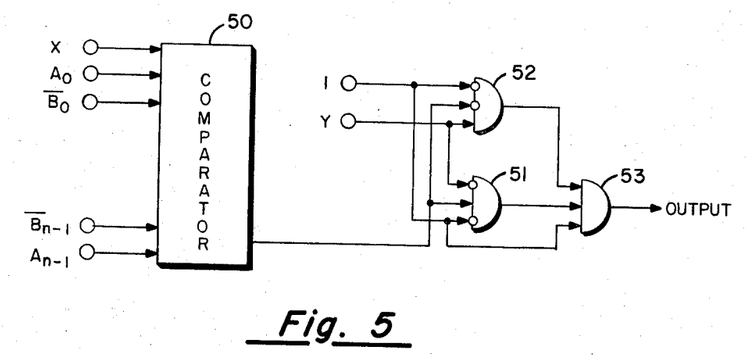

Reference is made to FIG. 5 of the drawings for a specific illustration of such a system using majority-decision logic. In this arrangement, the comparator block generally designated 50 is provided with a plurality of individual inputs including an A word input, B word input and an "X" input, the B word input being negated throughout the system. The comparator 50 may, of course, be the comparator as illustrated in detail in FIG. 2. The output of the comparator 50 is carried to a pair of individual majority-decision logic elements 51 and 52, this result being negated in the case of one of the logic elements. In addition, a "Y" input and a negated "1" input is provided to the elements 51 and 52. The output of the majority-decision elements 51 and 52 is carried to third element 53 together with an unconditional "1" input. The output derived from this system is set forth in the following: If $X=0$ and $Y=0$, then output is $A>B$
$X=1$ and $Y=0$, then output is $A \geqslant B$
$X=0$ and $Y=1$, then output is $B \geqslant A$
$X=1$ and $Y=1$, then output is $B>A$ Referring to FIG. 7 of the drawings a full parallel comparator, for seven bit words A and B is shown. The numeral 107 generally indicates a comparator constructed in accordance with the embodiment shown in FIG. 2, and can be constructed from the carry generator of FIG. 1(a) by eliminating elements which do not contribute to the output, as explained above. By adding three elements, a partial comparator of the type shown in FIG. 2 may be converted to a full comparator. Elements 10', 13', and 100' are coupled in a manner similar to elements 10, 13 and 100 to provide, simultaneously, outputs corresponding to condition $A>B$ and $A \geqslant B$. In general, a partial comparator of the type shown in FIG. 2 can be modified to give a full comparator by the addition of N elements where each of the N additional elements generate signals in accordance with:

$$K'_j = \alpha_{2(2^{N_i}-1)}^{N_i} \# \beta_{2(2^{N_i}-1)}^{N_i} \# K'_{2^{N_i}-2}$$

Figure 7:
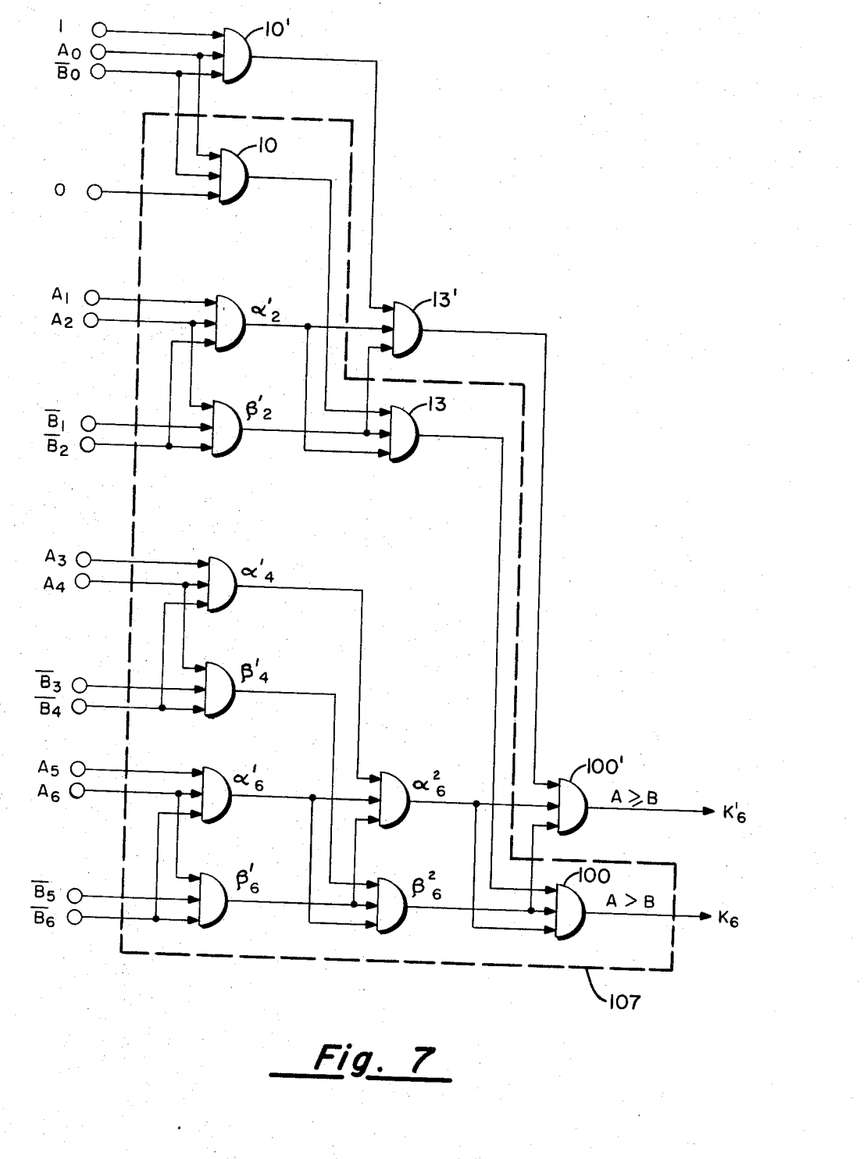
FIG. 7 is a logic diagram of a full parallel comparator designed in accordance with the present invention.

As shown in FIG. 7, $K_6$ is representative of the condition $A>B$ and $K_6'$ is representative of the condition $A \geqslant B$. From these two conditions the remaining three conditions can be realized as follows:

$$A \geqslant B = \overline{A<B}$$
$$A>B = \overline{A \leqslant B}$$
$$\overline{(A<B) \cdot (A>B)} = (A=B)$$

In the event $n$ is such that the last group is not full $K_{n-1}$ and $K'_{n-1}$ are generated in accordance with the generation of $C_{n-1}$, as set forth above.

Figure 3:
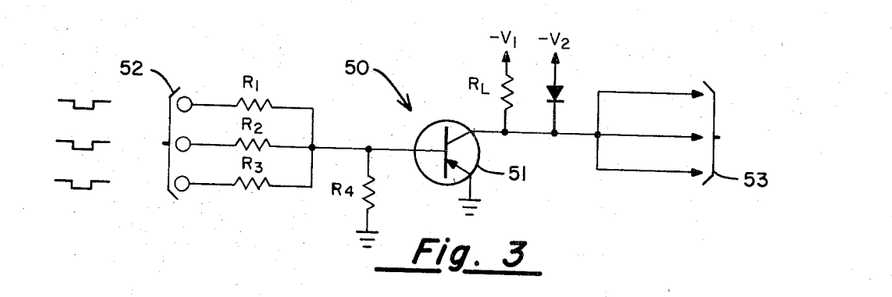
FIG. 3 is a circuit diagram of one type of majority-decision element which may be employed in connection with the system of the present invention.

Referring now to the transistor controlled majority-decision circuit described in FIG. 3, it will be observed that the system generally designated 50 includes a transistor 51 having a plurality of substantially matched inputs at 52 and having a group of outputs at 53. A germanium clamping diode is provided in the output in order to control the magnitude of the output, independent of the number of active inputs. The majority element utilizes a going pulse signal as representative of a binary "1," with a ground input being representative of a binary "0." Since the output from this system is inverted from the input, a suitable additional inverter may be employed if inversion at the output is not desired. In the operation, an input pulse is applied at the input 52, one input being insufficient in magnitude to cause transistor 51 to conduct. The magnitude of two or more pulses are, on the other hand, capable of starting the transistor into conduction, this conduction in turn, being represented by an inverted pulse occurring in the output so long as a majority of binary "1's" are being represented at the input. Regarding orders of magnitude, the value of $V_1$ is in the range of about $-4$ volts, $V_2$ is in the range of about $-2$ volts, and $V_3$ is of the order of $-4$ volts. For proper operation, it is essential that $V_2$ be lower in magnitude than $V_1$. The input resistors $R_1$, $R_2$ and $R_3$ are preferably in the range of about 500 ohms, $R_4$ is preferably about 50 ohms and $R_L$ is preferably about 400 ohms. This circuitry arrangement is suitable for performing appropriate majority-decision logic determinations.

Referring to FIG. 4 of the drawing, a parametric oscillator generally designated 38 is shown, the system including a pair of laminated or ferrite cores 39 and 40. Windings 41, 42, 43 and 44 are provided as illustrated in the drawing. Windings 41 and 42 are in series and in phase, while windings 43 and 44 are counter-wound and according provide signals to the cores which are out of phase. Windings 43 and 44 along with a capacitor 48 comprise a resonant circuit having a normal resonant circuit frequency $f$. Since windings 43 and 44 are arranged in counter-phase relationship, a system balance is maintained which avoids direct coupling of the initial excited current to the resonant current. A source of excitation current 46 having a normal frequency $2f$, and a direct current source such as the battery 47 is provided in order to operate the cores 39 and 40 at a point of permeability which provides a maximum variation of the magnetization of the cores relative to the level of the excitation current source. When the excitation current at frequency $2f$ is supplied to the windings 41 and 42, the resonant circuit including windings 43 and 44 and capacitor 48 oscillates in a subharmonic frequency of the order of one-half of the excitation frequency, this frequency being conveniently designated $f$. The resonant oscillation is of relatively low intensity, and this oscillation is of a frequency $f$. The sources 46 and 47 provide what is commonly termed the "pumping current" to the parametron network. One or more signal sources are provided at 49, each of these having a frequency $2f$, and being arranged to be connected to the resonant circuit. When the signal source is energized, the amplitude of current in the resonant circuit increases rapidly until an upper limit is reached, and from this point on the oscillation is maintained at a stable level. The phase of the oscillation occurring in the resonant circuit is either at a certain given phase representative of a binary "1" or at a phase which shifted by $\pi$ radians, this phase representing a binary "0." The phases of oscillation cannot be other than one or the other. It will be appreciated, of course, that a single core parametron may be suitably utilized in place of the dual core network shown and described herein. Thin film cores may also be advantageously utilized.

Applying this arrangement to a majority-decision system, a binary "1" will be represented in the phase of the output only when a majority of the input signals must represent a binary "1" in order to have the output to be so constituted. In the same fashion, a signal representing a binary "0" will occur in the output only when a majority of the input signal to the parametron network represent a binary "0." This apparatus is readily adaptable for installation in a system such as is illustrated in FIGS. 1, 2, and 5.

It will be appreciated that the various specific embodiments as described herein are provided for purposes of illustration only and accordingly there is no intention of limiting the scope of the data processing system of the present invention to these specific embodiments alone. It will be further appreciated that those persons skilled in the art may make certain modifications without departing from the spirit and scope of the present invention.

What is claimed is:

1. A carry generator, for generating $n$ signals $C_{n-1}$ ... $C_i$ ... $C_1C_0$, representative of carries corresponding to an augend of the form $A_{n-1}$ ... $A_i$ ... $A_1A_0$ and an addend of the form $B_{n-1}$ ... $B_i$ ... $B_1B_0$, comprising:

N carry generating groups $N_i=0$ ... $N-1$, where N is defined by the relation $2^{N-1} \leqslant n < 2^N$, for generating signal representations of $C_{n-1}$ ... $C_i$ ... $C_1C_0$, each of said carry generating groups $N_i=0 \ldots N-2$, coupled to the next lower carry generating group, for generating $2^{N_i}$ signals representative of $$C_{2(2^{N_i}-1)} \ldots C_{2^{N_i}-1}$$

corresponding to digit orders $$A_{2(2^{N_i}-1)} \ldots A_{2^{N_i}-1}$$

of said augend and digit orders $$B_{2(2^{N_i}-1)} \ldots B_{2^{N_i}-1}$$

of said addend, comprising;
    input means for receiving signal representations of digit orders $$A_{2(2^{N_i}-1)} \ldots A_{2^{N_i}-1}, B_{2(2^{N_i}-1)} \ldots B_{2^{N_i}-1}$$

and carry signal $$C_{2^{N_i}-2}$$

the latter being representative of the highest digit order carry generated by the next lower carry generating group, and
    means coupled to said input means for utilizing said digit order and carry signals to generate signals representative of $$C_{2^{N_i+1}-3} \ldots C_{2^{N_i}-1}$$

and to generate a signal representative of $$C_{2(2^{N_i}-1)}$$

in accordance with the function, $$C_{2(2^{N_i}-1)} = \alpha_{2(2^{N_i}-1)}^{N_i} \# \beta_{2(2^{N_i}-1)}^{N_i} \# C_{2^{N_i}-2}^{N_i}$$

said carry generating group $N_i=N-1$, coupled to the next lower carry generating group, for generating $$n - \sum_{N_i=0}^{N-2} 2^{N_i}$$

signals representative of carries $C_{n-1} \ldots C_{2^{N-1}-1}$ corresponding to digit orders $A_{n-1} \ldots A_{2^{N-1}-1}$ of said augend and digit orders $B_{n-1} \ldots B_{2^{N-1}-1}$ of said addend, comprising;
    input means for receiving signal representations of digit orders $A_{n-1} \ldots A_{2^{N-1}-1}$, $B_{n-1} \ldots B_{2^{N-1}-1}$, and carry signal $C_{2^{N-1}-2}$, the latter being representative of the highest digit order carry generated by the next lower carry generating group, and
    means coupled to said input means for utilizing said digit order and carry signals to generate signals representative of $C_{n-2} \ldots C_{2^{N-1}-1}$ and to generate a signal representative of $C_{n-1}$ in no more than $N$ logic levels if $n-1<2^N-2$ and in accordance with the function, $$C_{n-1} = \alpha_{2^N-2}^{N-1} \# \beta_{2^N-2}^{N-1} \# C_{2^{N-1}-2}$$

if $n-1=2^N-2$.

2. A carry generator as defined in claim 1 in which said signal representations of $$C_{2^{N_i+1}-3} \ldots C_{2^{N_i}-1}$$

$N_i=0 \ldots N-2$, and $C_{n-2} \ldots C_{2^{N-1}-1}$ are generated in no more than $N$ logic levels, said signal representations of $$C_{2(2^{N_i}-1)}$$

$N_i=0 \ldots N-2$, are generated in $N_i+1$ logic levels, and said signal representation of $C_{n-1}$ is generated in $N$ logic levels.

3. A carry generator as defined in claim 2 in which each of said groups $N_i=0 \ldots N-1$ comprises a network of majority logic elements arranged such that signal representations of $$C_{2^{N_i+1}-3} \ldots C_{2^{N_i}-1}$$

and $$C_{n-2} \ldots C_{2^{N-1}-1}$$

are generated utilizing a minimum number of majority logic elements.

4. A carry generator, for generating $n$ signals $C_{n-1} \ldots C_1 \ldots C_1 C_0$, when $n$ is of the form $2^N-1$, representative of carries corresponding to an augend of the form $A_{n-1} \ldots A_1 \ldots A_1 A_0$ and an addend of the form $B_{n-1} \ldots B_1 \ldots B_1 B_n$, comprising;
    $N$ carry generating groups $N_i=0 \ldots N-1$, for generating signal representations of $C_{n-1} \ldots C_1 \ldots C_1 C_0$, each of said carry generating groups $N_i=0 \ldots N-1$, coupled to the next lower carry generating group, for generating $2^{N_i}$ signals representative of signals of $$C_{2(2^{N_i}-)} \ldots C_{2^{N_i}-1}$$

corresponding to digit orders $$A_{2(2^{N_i}-1)} \ldots A_{2^{N_i}-1}$$

of said augend and digit orders $$B_{2(2^{N_i}-1)} \ldots B_{2^{N_i}-1}$$

of said addend, comprising,
    input means for receiving signal representations of digit orders $$A_{2(1^{N_i}-1)} \ldots A_{2^{N_i}-1}, B_{2(2^{N_i}-1)} \ldots B_{2^{N_i}-1}$$

and carry signal $$C_{2^{N_i}-2}$$

the latter being representative of the highest digit order carry generated by the next lower carry generating group, and
    means coupled to said input means for utilizing said digit order and carry signals to generate signals representative of $$C_{2^{N_i+1}-3} \ldots C_{2^{N_i}-1}$$

in no more than $N$ logic levels and to generate a signal representative of $$C_{2(2^{N_i}-1)}$$

in accordance with the function, $$C_{2(2^{N_i}-1)} = \alpha_{2(2^{N_i}-1)}^{N_i} \# \beta_{2(2^{N_i}-1)}^{N_i} \# C_{2^{N_i}-2}$$

in $N_i+1$ logic levels.

5. A carry generating group $N_i=1, 2, \ldots$, for generating $2^{N_i}$ signals representative of $$C_{2(2^{N_i}-1)} \ldots C_{2^{N_i}-1}$$

corresponding to digit orders $$A_{2(2^{N_i}-1)} \ldots A_{2^{N_i}-1}$$

of an augend of the form $A_{n-1} \ldots A_1 \ldots A_1 A_0$ and digit orders $$B_{2(2^{N_i}-1)} \ldots B_{2^{N_i}-1}$$

of an addend of the form $B_{n-1} \ldots B_1 \ldots B_1 B_0$, comprising;
    input means for receiving signal representations of digit orders $$A_{2(2^{N_i}-1)} \ldots A_{2^{N_i}-1}, B_{2(2^{N_i}-1)} \ldots B_{2^{N_i}-1}$$

and carry signal $$C_{2^{N_i}-2}$$

the latter being representative of the highest digit order carry generated by a next lower carry generating group, and
    means coupled to said input means for utilizing said digit order and carry signals to generate signals representative of $$C_{2^{N_i+1}-3} \ldots C_{2^{N_i}-1}$$

and to generate a signal representative of $$C_{2(2^{N_i}-1)}$$

in accordance with the function, $$C_{2(2^{N_i}-1)} = \alpha_{2(2^{N_i}-1)}^{N_i} \# \beta_{2(2^{N_i}-1)}^{N_i} \# C_{2^{N_i}-2}$$

6. A carry generating group as defined in claim 5 in which said generating means comprises a network of majority logic elements arranged such that $$C_{2(2^{N_i}-1)}$$

is generated in $N_i+1$ logic levels.

7. A signal generating group $N_i = 1, 2, \ldots$, for generating at least one signal $$C_{2(2^{N_i}-1)}$$

corresponding to digit orders $$A_{2(2^{N_i}-1)} \text{ and } B_{2(2^{N_i}-1)}$$

of two words of the form $A_{n-1} \ldots A_1 A_0 \ldots A_1 A_c$ and $B_{n-1} \ldots B_1 \ldots B_1 B_0$, comprising;
  input means for receiving signal representations of digit orders $$A_{2(2^{N_i}-1)} \ldots A_{2^{N_i}-1}, B_{2(2^{N_i}-1)} \ldots B_{2^{N_i}-1}$$

and a signal $$C_{2(2^{N_i}-1)}$$

the latter being the highest order signal generated by a next lower generating group, and
  means coupled to said input means for utilizing said input signals to generate a signal $$C_{2(2^{N_i}-1)}$$

in accordance with the function, $$C_{2(2^{N_i}-1)} = \alpha_{2(2^{N_i}-1)}^{N_i} \# \beta_{2(2^{N_i}-1)}^{N_i} \# C_{2^{N_i}2}$$

8. A signal generating group as defined in claim 7 in which said generating means comprises a network of majority logic elements arranged such that $$C_{2(2^{N_i}-1)}$$

is generated in $N_i+1$ logic levels.

9. A comparator for generating $n$ signals $K_{n-1} \ldots K_1 \ldots K_1 K_0$, representative of comparisons through the $j$th digit order of two words A and B of the form $A_{n-1} \ldots A_1 \ldots A_1 A_0$ and $\overline{B}_{n-1} \ldots \overline{B}_1 \ldots \overline{B}_1 \overline{B}_0$, comprising:
  N signal generating groups $N_i = 0 \ldots N-1$, where N is defined by the relation $2^{N-1} \leq n < 2^N$, for generating signal representations of $K_{n-1} \ldots K_i \ldots K_1 K_0$,
  each of said signal generating groups $N = 0 \ldots N-2$, coupled to the next lower signal generating group, for generating $2^{N_i}$ signals representative of $$K_{2(2^{N_i}-1)} \ldots K_{2^{N_i}-1}$$

corresponding to digit orders $$A_{2(2^{N_i}-1)} \ldots A_{2^{N_i}-1}$$

and $$B_{2(2^{N_i}-1)} \ldots B_{2^{N_i}-1}$$

of words A and B comprising;
  input means for receiving signal representations of digit orders $$A_{2(2^{N_i}-1)} \ldots A_{2^{N_i}-1}, B_{2(2^{N_i}-1)} \ldots B_{2^{N_i}-1}$$

and comparison signal $$K_{2^{N_i}-2}$$

the latter being representative of the highest digit order comparison generated by the next lower group, and
  means coupled to said input means for utilizing said digit order and comparison signals to generate signals representative of $$K_{2^{N_i+1}-3} \ldots K_{2^{N_i}-1}$$

and to generate a signal representative of $$K_{2(2^{N_i}-1)}$$

in accordance with the function, $$K_{2(2^{N_i}-1)} = \alpha_{2(2^{N_i}-1)}^{N_i} \# \beta_{2(2^{N_i}-1)}^{N_i} \# K_{2^{N_i}-2}$$

said signal generating group $N_i = N-1$, coupled to the next lower signal generating group, for generating $$n - \sum_{N_i=0}^{N-2} 2^{N_i}$$

signals representative of carries $K_{n-1} \ldots K_{2^{N-1}-1}$ corresponding to digit orders $A_{n-1} \ldots A_{2^{N-1}-1}$ and $\overline{B}_{n-1}$
  input means for receiving signal representations of digit $\ldots \overline{B}_{2^{N-1}-1}$ of said words A and B, comprising;
    orders $A_{n-1} \ldots A_{2^{N-1}-1}, \overline{B}_{n-1} \ldots \overline{B}_{2^{N-1}-1}$ and comparison signal $K_{2^{N-1}-2}$, the latter being representative of the highest digit order comparison generated by the next lower carry generating group, and
  means coupled to said input means for utilizing said digit order and carry signals to generate signals representative of $K_{n-2} \ldots K_{2^{N-1}-1}$ and to generate a signal representative of $K_{n-1}$ in no more than N logic levels if $n-1 < 2^N - 2$ and in accordance with the function, $$K_{n-1} = \alpha_{2^N-2}^{N-1} \# \beta_{2^N-2}^{N-1} \# K_{2^{N-1}-2}$$

if $n-1 = 2^N - 2$.

10. A comparator, for generating N signals $K_j$ representative of comparisons through the $j$th digit order of two words of the form $A_{n-1} \ldots A_1 \ldots A_1 A_0$ and $\overline{B}_{n-1} \ldots \overline{B}_1 \ldots \overline{B}_1 \overline{B}_0$, comprising:
  N signal generating groups $N_i = 0 \ldots N-1$, where N is defined by the relation $2^{N-1} \leq n < 2^N$, for generating signal representations of $K_j$,
  each of said signal generating groups $N_i = 0 \ldots N-2$ coupled to the next lower signal generating group, for generating a signal $$K_{2(2^{N_i}-1)}$$

representative of a comparison through the $$2(2^{N_i}-1)\text{th}$$

digit order of A and B, comprising;
  input means for receiving signal representations of $$A_{2(2^{N_i}-1)} \ldots A_{2^{N_i}-1}, \overline{B}_{2(2^{N_i}-1)} \ldots \overline{B}_{2^{N_i}-1}, \text{ and } K_{2^{N_i}-2}$$

the latter being representative of the comparison generated by the next lower group, and
  means coupled to said input means for utilizing said digit order and comparison signals to generate a signal representative of $$K_{2(2^{N_i}-1)}$$

in accordance with the function, $$K_{2(2^{N_i}-1)} = \alpha_{2(2^{N_i}-1)}^{N_i} \# \beta_{2(2^{N_i}-1)}^{N_i} \# K_{2^{N_i}-2}$$

said signal generating group $N_i = N-1$ coupled to the next lower signal generating group, for generating $K_{n-1}$ comprising;
  input means for receiving signal representations of $A_{n-1} \ldots A_{2N-1}, \overline{B}_{n-1} \ldots \overline{B}_{2^{N-1}-1}$, and $K_{2^{N-1}-2}$, the latter being representative of the comparison generated by the next lower group, and
  means coupled to said input means for utilizing said digit order and comparison signals to generate a signal representation of $K_{n-1}$ in no more than N logic levels if $n-1 < 2^N - 2$ and in accordance with the function, $$K_{n-1} = \alpha_{2^N-2}^{N-1} \# \beta_{2^N-2}^{N-1} \# K_{2^{N_1}-2}$$

if $n-1 = 2^N - 2$.

11. A comparator as defined in claim 10 in which each of said groups $N_1 0 \ldots N-1$ comprises a network of majority logic elements arranged such that signal representations of $K_j$ are generated in $N_1 + 1$ logic levels when $j < n-1$ and said signal representation of $K_{n-1}$ is generated in N logic levels.

12. A comparator, for generating 2N signals $K_j$ and $K'_j$ representative of comparisons through the $j$th digit order of two words of the form $A_{n-1} \ldots A_1 \ldots A_1 A_0$ and $\bar{B}_{n-1} \ldots \bar{B}_1 \ldots \bar{B}_1 \bar{B}_0$, comprising:

N signal generating groups $N_1 = 0 \ldots N-1$, where N is defined by the relation $2^{N-1} \leq n < 2^N$, for generating signal representations of $K_j$ and $K'_j$, each of said signal generating groups $N_1 = 0 \ldots N-2$ coupled to the next lower signal generating group, for generating two signals $$K_{2(2^{N_1}-1)} \text{ and } K'_{2(2^{N_1}-1)}$$

representative of a comparison through the $$2(2^{N_1}-1)\text{th}$$

digit order of A and B, comprising;

input means for receiving signal representations of $$A_{2(2^{N_1}-1)} \ldots A_{2^{N_1}-1}, \bar{B}_{2(2^{N_1}-1)} \ldots \bar{B}_{2^{N_1}}$$

and $$K_{2^{N_1}-2}, \text{ and } K'_{2^{N_1}-2}$$

the latter two signal representations being representative of the comparison generated by the next lower group, and means coupled to said input means for utilizing said digit order and comparison signals to generate two signals representative of $$K_{2(2^{N_1}-1)} \text{ and } K'_{2(2^{N_1}-1)}$$

in accordance with the functions, $$K_{2(2^{N_1}-1)} = \alpha_{2(2^{N_1}-1)}^{N_1} \# \beta_{2(2^{N_1}-1)}^{N_1} \# K_{2^{N_1}-2} \quad \text{and}$$

$$K'_{2(2^{N_1}-1)} = \alpha_{2(2^{N_1}-1)}^{N_1} \# \beta_{2(2^{N_1}-1)}^{N_1} \# K_{2^{N_1}-2}$$

said signal generating group $N_1 = N-1$ coupled to the next lower signal generating group, for generating $K_{n-1}$ and $K'_{n-1}$ comprising;

input means for receiving signal representations of $A_{n-1} \ldots A_{2^{N-1}-1}$, $\bar{B}_{n-1} \ldots \bar{B}_{2^{N-1}-2}$, $K_{2^{N-1}-2}$, and $K'_{2^{N-1}-2}$, the latter two signal representations being representative of the comparison generated by the next group, and means coupled to said input means for utilizing said digit order and comparison signals to generate two signals representative of $K_{n-1}$ and $K'_{n-1}$ in no more than N logic levels if $$n-1 < 2^N - 2$$

and in accordance with the functions, $$K_{n-1} = \alpha_{2^N-2}^{N-1} \# \beta_{2^N-2}^{N-1} \# K_{2^{N-1}-2} \quad \text{and}$$

$$K'_{n-1} = \alpha_{2^N_2}^{N-1} \# \beta_{2^N-2}^{N-1} \# K'_{2^{N_{12}}}$$

if $n-1 = 2^N - 2$.

13. A comparator as defined in claim 12 in which each of said groups $N_1 = 0 \ldots N-1$ comprises a network of majority logic elements arranged such that signal representations of $K_j$ and $K'_j$ are generated in $N_1 + 1$ logic levels when $j < n-1$ and said signal representations of $K_{n-1}$ and $K'_{n-1}$ are generated in N logic levels.

14. A signal generating group $N_1 = 1, 2, \ldots$, for generating at least two signals $$K_{2(2^{N_1}-1)} \text{ and } K'_{2(2^{N_1}-1)}$$

corresponding to digit orders $$A_{2(2^{N_1}-1)} \text{ and } B_{2(2^{N_1}-1)}$$

of two words of the form $A_{n-1} \ldots A_1 \ldots A_1 A_0$ and $B_{n-1} \ldots B_1 \ldots B_1 B_0$, comprising;

input means for receiving signal representations of digit orders $$A_{2(2^{N_1}-1)} \ldots A_{2^{N_1}}, B_{2(2^{N_1}-1)} \ldots B_{2^{N_1}-1}$$

and signals $$K_{2^{N_1}-2} \text{ and } K'_{2^{N_1}-2}$$

the latter two being the highest order signals generated by a next lower generating group, and means coupled to said input means for utilizing said input signals to generate signals $$K_{2(2^{N_1}-1)} \text{ and } K'_{2(2^{N_1}-1)}$$

in accordance with the functions, $$K_{2(2^{N_1}-1)} = \alpha_{2(2^{N_1}-1)}^{N_1} \# \beta_{2(2^{N_1}-1)}^{N_1} \# K_{2^{N_1}-2} \quad \text{and}$$

$$K'_{2(2^{N_1}-1)} = \alpha_{2(2^{N_1}-1)}^{N_1} \# \beta_{2(2^{N_1}-1)}^{N_1} \# K_{2^{N_1}-2}$$

15. A signal generating group as defined in claim 14 in which said generating means comprises a network of majority logic elements arranged such that $$K_{2(2^{N_1}-1)} \text{ and } K'_{2(2^{N_1}-1)}$$

are generated in $N_1 + 1$ logic levels.

References Cited

Knoebel, R. A.: Anticipated Carry Majority Logic Mode. Bedford, Mass. The Mitre Corporation, Prepared under Contract AF 33 (600) 239852, Project 708, April 1963. Copy available through Defense Documentation Center for Scientific and Technical Information, Cameron Station, Alexandria, Va., catalogued as AD 407560 Copy available in Group 240. 340/146.2.

MALCOLM A. MORRISON, *Primary Examiner.*

ROBERT C. BAILEY, *Examiner.*

M. A. LERNER, M. J. SPIVAK, V. SIBER,
*Assistant Examiners.*

UNITED STATES PATENT OFFICE
CERTIFICATE OF CORRECTION

Patent No. 3,372,377                                            March 5, 1968

Marius Cohn et al.

It is hereby certified that error appears in the above numbered patent requiring correction and that the said Letters Patent should read as corrected below.

Column 11, lines 40 and 51, "$C_{2N-1_{-1}}$", each occurrence, should read -- $C_2N-1_{-1}$ --; lines 41 and 45, "$A_{2N-1_{-1}}$", each occurrence, should read -- $A_2N-1_{-1}$ --; lines 42 and 45, "$B_{2N-1_{-1}}$", each occurrence, should read -- $B_2N-1_{-1}$ --; line 46, "$C_{2N-1_{-2}}$" should read -- $C_2N-1_{-2}$ --; line 62, "$C_{2N-_{-1}}$" should read -- $C_2N-1_{-1}$ --; same column 11, line 75, "$C_2N_i+1_3$" should read -- $C_2N_i+1_{-3}$ --; column 12, line 10, "$B_1B_n$" should read -- $B_1B_0$ --; line 16, cancel "of signals"; line 19, "$C_{2(2^{N_i}{}_-)}$" should read -- $C_{2(2^{N_i}{}_{-1})}$ --; line 28, "$A_{2(1^{N_i}{}_{-1})}$" should read -- $A_{2(2^{N_i}{}_{-1})}$ --; line 45, "$\alpha^{N_i}_{2(N_{i-1})} \beta^{N_i}_{2(N_{i-1})}$" should read -- $\alpha^{N_i}_{2(2^{N_i}{}_{-1})} \beta^{N_i}_{2(2^{N_i}{}_{-1})}$ --; column 13, line 5, "$\alpha^{N_i}_{2(2^{N_i-1})} \beta^{N_i}_{2(2^{N_i-1})}$" should read -- $\alpha^{N_i}_{2(2^{N_i}{}_{-1})} \beta^{N_i}_{2(2^{N_i}{}_{-1})}$ --; line 19, "$A_1A_0...A_1A_c$" should read -- $A_i ... A_1A_0$ --; line 20, "$B_1$" should read -- $B_i$ --; line 24, "$A_{2(2^{N_i}{}_{-1})}$" should read -- $A_{2(2^{N_i}{}_{-1})}$ --; line 27, "$C_{2(2^{N_i}{}_{-1})}$" should read -- $C_2N_{i_{-2}}$ --; line 35, "$\alpha^{N_i}_{2(2^{N_i}{}_{-1})} \beta^{N_i}_{2(2^{N_i}{}_{-1})} C_2N_{i_2}$" should read -- $\alpha^{N_i}_{2(2^{N_i}{}_{-1})} \beta^{N_i}_{2(2^{N_i}{}_{-1})} C_2N_{i_{-2}}$ --; lines 62 and 67, "$B_{2(2^{N_i}{}_{-1})}...B_2N_{i_{-1}}$", each occurrence, should read -- $\overline{B}_{2(2^{N_i}{}_{-1})}...\overline{B}_2N_{i_{-1}}$ --; column 14, line 9, "$\alpha^{N_i}_{2(2^{N_i-1})} \beta^{N_i}_{2(2^{N_i-1})}$" should read -- $\alpha^{N_i}_{2(2^{N_i}{}_{-1})} \beta^{N_i}_{2(2^{N_i}{}_{-1})}$ --; line 16, "$K_{2N-1-I}$" should read -- $K_2N-1_{-1}$ --; line 17, "$A_{2N-1-1}$" should read 3,372,377

(2)

-- $A_2N\text{-}1_{-1}$ --; line 18, cancel "input means for receiving signal representations of digit" and insert the same after "comprising;" in line 19; lines 19, 20 and 69, "$\bar{B}_{2N-1-1}$", each occurrence, should read -- $\bar{B}_2N\text{-}1_{-1}$ --; line 20, "$A_{2N-1-1}$" should read -- $A_2N\text{-}1_{-1}$ --; line 45, "$K_2(2^{Ni}_{-1})$" should read -- $K_2(2^{N}_{i_{-1}})$ --; same column 14, line 69, "$A_2N\text{-}1$" should read -- $A_2N\text{-}1_{-1}$ --; column 15, line 7, "$N_iO$" should read -- $N_i=0$ --; line 30, "$\bar{B}_2N_i$" should read -- $\bar{B}_2N_{i_{-1}}$, $K_2N_{i_{-2}}$, -- ; line 45, "$K_2N_{i_{-2}}$" should read -- $K'_2N_{i_{-2}}$ --; line 52, "$\bar{B}_2N\text{-}1_{-2}$" should read -- $\bar{B}_2N\text{-}1_{-1}$ --; same column 15, line 55, after "next" insert -- lower --; column 16, line 5, "$\alpha^{N-1}_{2N_2}$" should read -- $\alpha^{N-1}_{2N_{-2}}$ --; same line 5, "$\#K_2N_{i_2}$" should read -- $K'_2N\text{-}1_{-2}$ --; line 15, "$K'_2(N_{i_{-1}})$" should read -- $K'_2(2^N_{i_{-1}})$ --; line 18, "$A_2(N_{i_{-1}})$" should read -- $A_2(2^N_{i_{-1}})$ --; line 23, "$A_2N_i$," should read -- $A_2N_{i_{-1}}$, -- ; same column 16, line 38, "$\#K_2N_{i_{-2}}$" should read -- $K'_2N_{i_{-2}}$ --.

Signed and sealed this 11th day of November 1969.

(SEAL)
Attest:

EDWARD M. FLETCHER, JR.
Attesting Officer

WILLIAM E. SCHUYLER, JR.
Commissioner of Patents